3,478,076
FUNCTIONAL PERFLUOROALKYLENE
ORGANOSILICON COMPOUNDS
Yung Ki Kim and Ogden R. Pierce, Midland, Mich., assignors to Dow Corning Corporation, Midland, Mich., a corporation of Michigan
No Drawing. Filed Dec. 2, 1966, Ser. No. 598,613
Int. Cl. C07f 7/18; C11c 3/00
U.S. Cl. 260—448.2                        4 Claims

ABSTRACT OF THE DISCLOSURE

Organosilanes and silanols of the formula

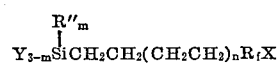

and siloxanes containing at least one unit of the formula

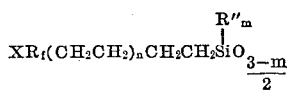

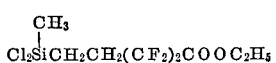

and

are examples of such compounds. These silanes and siloxanes are useful as lubricants, laminating resins, elastomers and surface active agents.

CROSS REFERENCE TO RELATED APPLICATION

The intermediates for the preparation of the compositions of this invention are described and claimed in the copending application Ser. No. 598,604 of Yung Ki Kim entitled "Fluoroethylene Compounds," filed Dec. 2, 1966. The disclosure of said application being hereby incorporated in this application by reference.

BACKGROUND OF THE INVENTION

This invention provides the art with new functional organosilicon compounds in which the fuctions are ester, carboxy, amide, etc. The unique feature being the bridge connecting said functional groups to the silicon atom. The organic functional group is attached directly to a perfluoroalkylene radical, which in turn, is connected to the silicon through an ethylene spacer. The ethylene spacer stabilizes the compounds to hydrolytic cleavage because fluorine attached to carbon atoms alpha or beta to silicon is unstable.

SUMMARY OF INVENTION

This invention relates to compounds of the formula

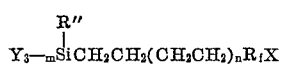

in which Y is a hydrolyzable group or —OH, R" is a monovalent hydrocarbon radical free of aliphatic unsaturation or a ACH$_2$CH$_2$— radical in which A is a perfluoroalkyl radical, $m$ and $n$ each have values of from 0 to 2 inclusive, R$_f$ is a perfluoroalkylene radical, X is a radical of the group CONH$_2$, C≡N and COOR' in which R' is an alkyl radical of 1 to 6 inclusive carbon atoms.

This invention further relates to siloxanes having at least one unit of the formula

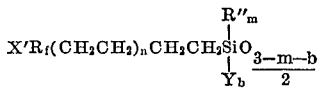

in which X' is COOH, CONH$_2$, C≡N and COOR' and R', R$_f$, $n$, $m$ and R" are as as above defined, and $b$ has a value from 0 to 2 inclusive, any remaining units in said siloxane being of the formula

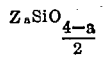

in which Z is a hydrocarbon or halohydrocarbon radical, a hydrogen atom, a Y group or —OH and $a$ has a value from 0 to 3 inclusive.

DETAILED DESCRIPTION OF THE INVENTION

The silanes of this invention are best prepared by reacting silanes of the formula

with (I) CH$_2$=CH(CH$_2$CH$_2$)$_n$R$_f$X in the presence of a platinum catalyst such as chloroplatinic acid in the conventional manner for adding SiH compounds to compounds having the terminal CH$_2$=CH group. The olefinic intermediates (I) are prepared in accordance with the description of the aforesaid copending application of Yong Ki Kim.

The silanols of this invention (i.e. where Y is —OH) are best prepared by hydrolyzing the corresponding hydrolyzable silanes under neutral conditions by any of the methods well known in the art for the preparation of silanols. The preferred method for preparing such silanols is by the hydrolysis of those compounds in which Y is methoxy.

The siloxanes of this invention can be prepared by two methods. One is by the hydrolysis or cohydrolysis of the above silanes, by conventional means, or by the cohydrolysis of the above defined silanes with silanes of the formula Z$_a$SiY$_{4-a}$ in which Z, $a$ and Y are as above defined. The particular method chosen for the hydrolysis or cohydrolysis can vary widely depending upon the nature of the substituent groups on the silicon. Hence there are no critical conditions other than the well-known techniques for hydrolyzing and cohydrolyzing silanes.

A second method of preparing such siloxanes is by the addition of compounds (I) supra to siloxanes containing SiH groups in the presence of platinum catalysts. The conditions for carrying out this condition are those normally employed for the addition of SiH containing siloxanes to olefins.

In those siloxanes in which X' is a carboxyl group it is preferred that such compounds be prepared by the hydrolysis of the corresponding esters, i.e. hydrolysis of

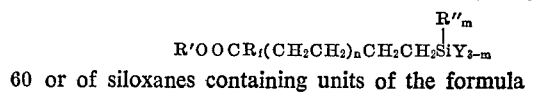

or of siloxanes containing units of the formula

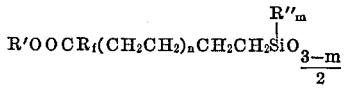

In general, better yields of the carboxylic acids are obtained by this method than by attempting to add unsaturated carboxylic acids directly to SiH compounds. The hydrolysis of the esters can be carried out in the conventional manner for the hydrolysis of organic esters.

In the compositions of this invention Y can be any hydrolyzable group such as halogen atoms; such as fluorine, chlorine, or bromine; hydrocarbonoxy groups such as methoxy, ethoxy, octadecycloxy, allyloxy, cyclohexyloxy, phenoxy, tolyloxy, benzyloxy, —OCH$_2$CH$_2$OCH$_3$ and

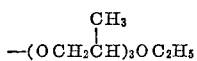

acyloxy groups such as acetoxy, propionyloxy, benzoyloxy, cyclohexoyloxy, and

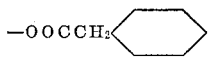

ketoxime groups such as —ON=C(CH$_3$)$_2$ and

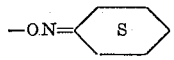

amine groups such as —NH$_2$, —N(CH$_3$)$_2$ and

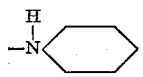

sulfide groups such as —SCH$_3$ and

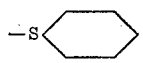

the nitrile groups, the isocyanate groups, sulfate groups such as

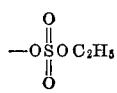

sulfonate groups such as

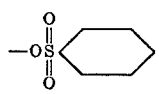

carbamate groups such as —OOCNHCH$_3$,

—OOCN(CH$_3$)$_2$ and —OOCN(C$_2$H$_5$)$_2$ and groups such as —ON(CH$_3$)$_2$ and —ON(C$_3$H$_7$)$_2$.

R″ can be any monovalent hydrocarbon radical free of aliphatic unsaturation such as alkyl radicals such as methyl, ethyl, isopropyl, t-butyl, octadecyl or myricyl; cycloaliphatic radicals such as cyclohexyl, cyclopentyl and cyclohexenyl; aromatic hydrocarbon radicals such as phenyl, tolyl, xenyl, naphthyl and xylyl; and aralkyl hydrocarbon radicals such as benzyl, beta-phenylethyl, and beta-phenylpropyl.

R″ can also be any radical of the formula

ACH$_2$CH$_2$— in which A is a perfluoroalkyl radical such as CF$_3$, C$_2$F$_5$, C$_8$F$_{17}$, C$_{10}$F$_{21}$, (CF$_3$)$_2$CF— and

R$_f$ can be any perfluoroalkylene radical such as —CH$_2$—, —CF$_2$CF$_2$—, —(CF$_2$)$_{18}$,

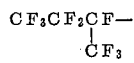

R′ can be any lower alkyl radical such as methyl, ethyl, isopropyl or hexyl.

As can be seen the siloxanes of this invention can be homopolymers or they can be copolymers containing various types of the fluoroalkylene containing siloxane units. When Q represents group XR$_f$(CH$_2$CH$_2$)$_n$CH$_2$CH$_2$— the siloxanes of this invention can be represented by the general unit formula QSiO$_{3/2}$,

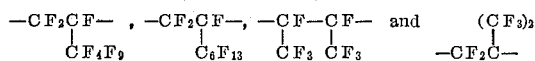

or any combination thereof. In addition the siloxanes can contain siloxane units of the formula

in which $a$ has a value of from 0 to 3 inclusive. This includes units of the type SiO$_2$, ZSiO$_{3/2}$, Z$_2$SiO, Z$_3$SiO$_{1/2}$. Z can be a hydrogen atom, any of the above defined Y groups, a hydroxyl group or any hydrocarbon radical such as any of the radicals specifically shown for R″ above, divalent hydrocarbon radicals such as alkylene radicals such as methylene, dimethylene, trimethylene, or tetramethylene; arylene radicals such as phenylene, xenylene, tolylene, xylylene or naphthylene; and cycloalkylene radicals such as cyclohexylene and cyclopentylene, Z can also be any alkenyl radical such as vinyl, allyl, hexenyl and butadienyl.

Z can also be any halohydrocarbon radical such as chloromethyl, gamma-chloropropyl, bromooctadecyl, chlorocyclohexyl, bromocyclohexenyl, 3-chlorobutenyl-4, chlorophenyl, bromoxenyl, α,α,α-trifluorotolyl, tetrachlorophenyl, p-chlorobenzyl, 3,3,3-trifluoropropyl and

C$_{10}$F$_2$—CH$_2$CH$_2$—

The compositions of this invention are useful for a wide variety of applications. These include oleophobic coatings, lubricants for metallic parts, elastomers, laminating resins, and surface active agents.

The following examples are illustrative only and should not be construed as limiting the invention, which is properly delineated in the appended claims.

Example 1

To a mixture of 150 g. (.75 m.) of

CH$_2$=CH(CF$_2$)$_2$COOC$_2$H$_5$ and .75 ml. of chloroplatinic acid in absolute ethanol was added a total of 0.85 mole of methyldichlorosilane as follows: 10 g. of the silane was added and the mixture was stirred and heated. When the temperature reached 80° C. the reaction started and heating was discontinued when the temperature reached 110° C. The remaining silane was then added at such a rate that the temperature was maintained between 110° and 120° C. The entire reaction was carried out in an atmosphere of dry nitrogen.

The crude product was distilled to give the compound

the B.P. 120° C. at 20 mm. and refractive index at 25° C. of 1.4065.

Example 2

30 g. of the silane of Example 1 was added with stirring to a mixture of 200 ml. of water and 30 g. of sodium bicarbonate. The reaction was carried out at ice bath temperature. The mixture was taken up in ether and the ether layer was separated, washed and dried. The solvent was evaporated to give a clear viscous oil which contained silicon-bonded hydroxyl groups, i.e. units of the formula

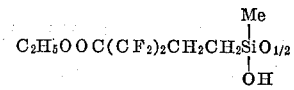

The oil was mixed with tetra-methyl guanidine acetate and heated under vacuum for 24 hours at 75° to 125° C. Water was removed during polymerization. A viscous siloxane fluid was obtained which had the unit formula

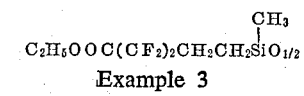

Example 3

When the following fluoroalkylene compounds are added to the following silanes in accordance with the procedure of Example 1, the following products are obtained.

| Fluoroalkylene Compound | Silane | Product |
|---|---|---|
| $CH_2=CH(CF_2)_2CONH_2$ | $HSiO(C_2H_5)_3$ | (1) $H_2NOC(CF_2)_2CH_2CH_2Si(OC_2H_5)_3$ |
| $CH_2=CHCH_2CH_2(CF_2)_2COOC_2H_5$ | $HSiCl_2$ with $CH_3$ | (2) $C_2H_5OOC(CF_2)_2(CH_2)_4SiCl_2$ with $CH_3$ |
| $CH_2=CH(CF_2)_2C\equiv N$ | $HSiCl$ with $(CH_3)_2$ | (3) $N\equiv C(CF_2)_2CH_2CH_2SiCl$ with $(CH_3)_2$ |
| $CH_2=CH(CF_2)_6COOC_6H_{13}$ | $HSiCl_2$ with $C_6H_5$ | (4) $H_{13}C_6OOC(CF_2)_6CH_2CH_2SiCl_2$ with $C_6H_5$ |
| $CH_2=CH(CF_2)_{18}COOCH_3$ | $HSi(OOCCH_3)_2$ with $C_{18}H_{37}$ | (5) $CH_3OOC(CF_2)_{18}CH_2CH_2Si(OOCCH_3)_2$ with $C_{18}H_{37}$ |
| $CH_2=CH(CH_2CH_2)_2(CF_2)_2C\equiv N$ | $HSi[ON=C(CH_3)_2]_3$ | (6) $N\equiv C(CF_2)_2(CH_2)_6Si[ON=C(CH_3)_2]_3$ |
| $CH_2=CHCFCF_2COOC_2H_5$ with $CF_3$ | $HSi[OOCN(CH_3)_2]_2$ with $CH_2CH_2CF_3$ | (7) $C_2H_5OOCCF_2CF(CH_2)_2Si[OOCN(CH_3)_2]_2$ with $CH_2CH_2CF_3$ and $CF_3$ |

Example 4

When the silane products of Example 3 are hydrolyzed and cohydrolyzed as shown below the following siloxanes are obtained. The proportions are in mol percent.

| Silane Product of Example 3 | Other Silanes | Reagent | Siloxane Produced |
|---|---|---|---|
| (1) | | 1 wt. percent aqueous acetic acid | $H_2NOC(CF_2)_2CH_2CH_2SiO_{3/2}$ |
| (2) | | Water | $C_2H_5OOC(CF_2)_2(CH_2)_4SiO$ with $CH_3$ |
| (3) | | do | $N\equiv C(CF_2)_2CH_2CHSiO_5$ with $(CH_3)_2$ |
| 50% (4) | | do | Copolymer of— 50% $H_{13}C_6OOC(CF_2)_6CH_2CH_2SiO$ with $C_6H_5$ |
| 25% (5) | | | 25% $CH_3OOC(CF_2)_{18}CH_2CH_2SiO$ with $C_{18}H_{37}$ |
| 25% (6) | | | 25% $N\equiv C(CF_2)_2(CH_2)_6SiO_{3/2}$ |
| 50% (1) | 25% $(CH_3)_2Si(OCH_3)_2$ <br> 10% $C_6H_5Si(OC_2H_5)_3$ <br> 10% $CH_2=CHSi(OC_2H_5)_3$ <br> 5% $C_6H_{11}Si(OC_2H_5)_3$ | 10 wt. percent aqueous HCl | Copolymer of— <br> 50% $H_2NOC(CF_2)_2CH_2CH_2SiO_{3/2}$ <br> 25% $(CH_3)_2SiO$ <br> 10% $C_6H_5SiO_{3/2}$ <br> 10% $CH_2=CHSiO_{3/2}$ <br> 5% $C_6H_{11}SiO_{3/2}$ |
| 1% (3) | 9% $CF_3CH_2CH_2SiCl_3$ <br> 40% $(CH_3)_2SiCl_2$ <br> 25% $CH_3SiCl_3$ <br> 25% $C_6H_5SiCl_3$ | Water | Copolymer of— <br> 1% $N\equiv C(CF_2)_2CH_2CH_2SiO_{.5}$ with $(CH_3)_2$ <br> 9% $CF_3CH_2CH_2SiO_{3/2}$ <br> 40% $(CH_3)_2SiO$ <br> 25% $CH_3SiO_{3/2}$ <br> 25% $C_6H_5SiO_{3/2}$ |
| 30% (2) | 10% $CH_3SiCl_2$ with H | do | 30% $C_2H_5OOC(CF_2)_2(CH_2)_4SiO$ with $CH_3$ |
| 30% (4) | 30% $CH_2=CClCH_2CH_2SiCl_2$ with $CH_3$ | | 30% $H_{13}C_6OOC(CF_2)_6CH_2CH_2SiO$ with $C_6H_5$ <br> 10% $CH_3SiO$ with H <br> 30% $CH_2=CClCH_2CH_2SiO$ with $CH_3$ |
| 80% (3) | 20% $Si(OC_2H_5)_4$ | do | $\left[N\equiv C(CF_2)_2CH_2CH_2SiO \text{ with } (CH_3)_2\right]_4 Si$ |
| 25% (1) | 75% $(CH_3)_3SiCl$ | do | $H_2NOC(CF_2)_2CH_2CH_2Si[OSi(CH_3)_3]_3$ |
| (2) | | 10 mol percent theory water | $H_5C_2OOC(CF_2)_2(CH_2)_4\begin{array}{c}ClSi\\|\\CH_3\end{array}\left[\begin{array}{c}(CH_2)_4(CF_2)_2COOC_2H_5\\|\\OSi\\|\\CH_3\end{array}\right]_9 Cl$ [1] |
| (4) | | Aqueous ammonia at 30° C | $H_{13}C_6OOC(CF_2)_6CH_2CH_2Si(OH)_2$ with $C_6H_5$ |

[1] Average formula.

Example 5

When the siloxane ester

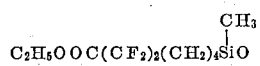

is hydrolyzed with aqueous HCl under refluxing conditions the siloxane

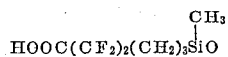

is obtained. This siloxane can also be obtained by reacting the siloxane ester with an equivalent amount of acetic acid in the presence of a catalytic amount of HCl under conditions where ethylacetate distills from the mixture.

Example 6

54 g. of $CH_2=CHCF_2CF_2COOC_2H_5$ was placed in a flask together with .3 ml. of a .1 mol solution of $H_2PtCl_6 \cdot H_2O$ in ethanol. To the mixture was added with stirring 40.1 g. of $HSiCl_3$. The silane was added slowly at a temperature of 100° to 115° C. The reaction was carried out under $N_2$. After stirring overnight the mixture was distilled to give $C_2H_5OOCCF_2CF_2CH_2CH_2SiCl_3$, B.P. 98° C. at 6 mm., $n_D^{26}$ 1.4080.

When this material is hydrolyzed a resinous siloxane of the unit formula $C_2H_5OOCCF_2CF_2CH_2CH_2SiO_{3/2}$ is obtained.

That which is claimed is:

1. A compound of the formula

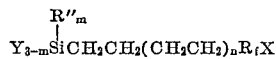

in which

Y is a hydrolyzable group or —OH;

R″ is selected from the group consisting of alkyl radicals, cycloaliphatic radicals, aromatic hydrocarbon radicals, aralkyl radicals, or $ACH_2CH_2$— radicals in which A is a perfluoroalkyl radical;

$m$ and $n$ each have values from 0 to 2 inclusive;

$R_f$ is a perfluoroalkylene radical; and

X is of the group consisting of $CONH_2$, $C\equiv N$ and COOR′ groups in which R′ is an alkyl radical of from 1 to 6 inclusive carbon atoms.

2. A compound of claim 1 in which $n$ is 0.
3. The compound of claim 1 in which Y is chlorine, $m$ is 1, R″ is methyl, $n$ is O, $R_f$ is —$CF_2CF_2$— and X is $COOC_2H_5$.
4. The compound of claim 1 in which Y is chlorine, $m$ and $n$ are both O, $R_f$ is —$CF_2CF_2$— and X is —$COOC_2H_5$.

References Cited

UNITED STATES PATENTS

| | | | |
|---|---|---|---|
| 2,900,363 | 8/1959 | Bluestein | 260—448.2 X |
| 3,038,000 | 6/1962 | Schmidt. | |
| 3,065,202 | 11/1962 | Bluestein | 260—448.2 X |
| 3,112,333 | 11/1963 | Bailey. | |
| 3,128,297 | 4/1964 | Kanner et al. | |
| 3,318,843 | 5/1967 | Bluestein | 260—448.2 X |
| 3,331,813 | 7/1967 | Pittman et al. | 260—448.2 X |

TOBIAS E. LEVOW, Primary Examiner

P. F. SHAVER, Assistant Examiner

U.S. Cl. X.R.

252—49.6, 351; 260—448.8, 408, 46.5